May 29, 1962 G. WEBER 3,037,116
APPARATUS FOR IRRADIATING LIQUIDS
Filed July 15, 1958
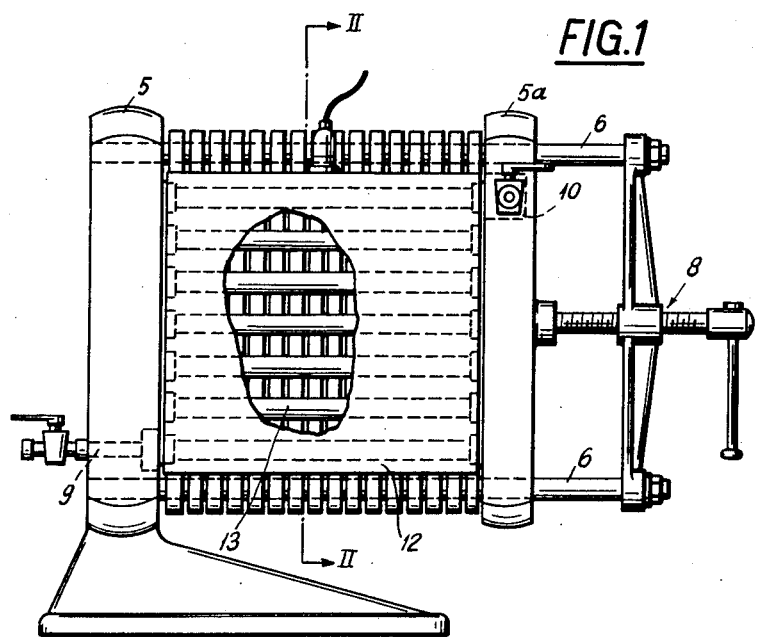
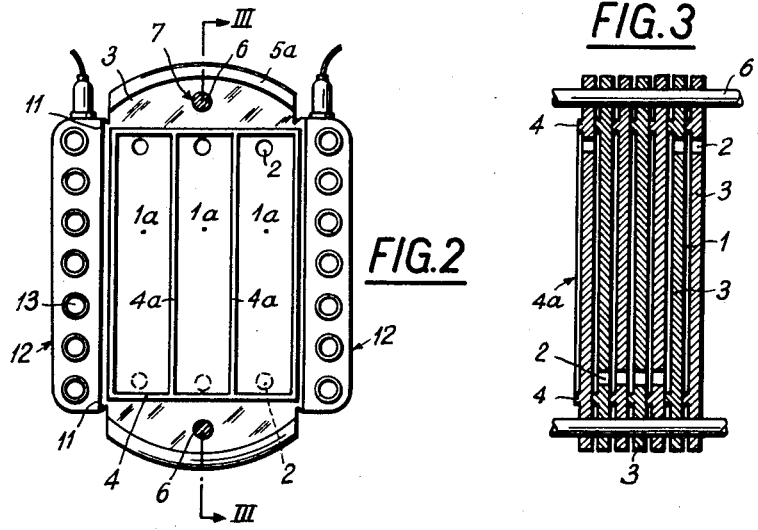

United States Patent Office 3,037,116
Patented May 29, 1962

3,037,116
APPARATUS FOR IRRADIATING LIQUIDS
Georges Weber, 108 Rue de Villars, Denain, France
Filed July 15, 1958, Ser. No. 748,732
Claims priority, application Switzerland July 26, 1957
6 Claims. (Cl. 250—48)

The present invention has for its object an apparatus for irradiating liquids.

This apparatus is characterizd by the fact that it comprises a series of compartments made of material transparent to radiations in a predetermined range of wave lengths and communicating with each other, through which the liquid to be irradiated is flowing, and at least one irradiating device producing radiations in said range of wave lengths and directing them towards the said compartments.

The accompanying drawings show by way of example an embodiment of the apparatus according to the invention. In said drawings:

FIG. 1 is a side view of the apparatus.
FIG. 2 is a sectional view along the line II—II of FIG. 1.
FIG. 3 is a sectional view along the line III—III of FIG. 2.

The apparatus shown comprises a series of compartments 1 made of material transparent to actinic rays and communicating with each other by openings 2 located alternatively at the lower end upper part of successive groups of adjacent compartments, so as to permit the passage of a liquid through the said compartments.

The compartments 1 are formed by a juxtaposition of a series of plates 3 provided each with a peripheral rib 4 which projects from one of its surfaces, and at least one opening 2 in each plate inside the area limited by rib 4 and near the upper or lower part of each plate. The plates 3 are built symmetrically so that the part of rib 4 near which opening 2 is located may be mounted indifferently at the upper or at the lower part of the assembly of plates 3, the rib 4 of each plate being pressed fluidtightly against the flat surface of an adjacent plate. Upright ribs 4a parallel to the upright part of rib 4 may be provided in order to subdivise each compartment 1 into two or three separate compartments 1a, and in this case one or two additional openings 2 will have to be provided along the upper or lower part of rib 4 for providing a passage for the liquid between each of the said compartments 1a. The plates 3 are assembled between two upright standards 5 and 5a, standard 5a being slidingly mounted on two horizontal bars 6 secured to standard 5 and passing through openings 7 provided in each plate 3 near its upper and lower rims beyond the area limited by rib 4. A screwing device 8 is provided for pressing fluidtightly the peripheral rib 4 of each plate against the flat surface of an adjacent plate. An admission duct 9 for the liquid to be treated is provided at the bottom of standard 5 and a delivery duct 10 for the liquid which has been treated is provided at the upper part of standard 5a, the plate 3 being assembled in such a manner that the openings 2 of the first and last plate are located respectively in front of admission duct 9 and delivery duct 10. The rims of plates 3 which project laterally on both sides of standards 5 and 5a are provided at their upper and lower ends with grooves 11 onto which incurved upper and lower rims of two actinic rays irradiating devices 12 are slidingly secured on both sides of the apparatus after assembly of the plates 3 between the standards 5 and 5a.

The liquid which passes through the compartments 1 will be irradiated by actinic rays, the wave length of which is comprised between 3500 and 4500 A., which will have a chemical action on certain products contained in the liquid, the actinic rays penetrating sidewards into the plates 3 before spreading into the compartments 1. In a preferred embodiment of the invention, plates 3 are made of Plexiglas but they may be made of any transparent material which has no filtrating effect on the rays produced by the actinic rays irradiating devices 12.

Instead of being provided with lamps 13 which produce actinic rays which are especially useful for inducing an artificial ripening of freshly prepared beer, the irradiating devices 12 may be provided with ultra-violet lamps where the apparatus is used, for example, for increasing the vitamin D contents of milk, or with any other type of irradiating lamps depending on the liquid which passes through the apparatus and on the treatment to which it should be submitted. In this case plates 3 should, of course, be made of a material transparent specifically to ultra-violet rays or other types of radiations used.

What I claim is:

1. An apparatus for irradiating liquids comprising a plurality of plates made of a material transparent to radiation in a predetermined range of wave lengths and including a first outer plate and a last outer plate, each of said plates being provided with a peripheral rib which projects from one of its surfaces and defines an area within which there is provided an opening near said rib, said plates being assembled side by side in parallel planes, the peripheral rib of each plate abutting fluid-tightly against the flat surface of an adjacent plate to form a series of fluid-tight relatively-thin compartments intercommunicating with each other by means of said opening in each plate and through which compartments the liquid to be irradiated is adapted to flow seriatim as a thin flat stream, and at least one irradiating device for producing radiations in said range of wave lengths and to direct them sidewise towards the assembly of plates so that they will penetrate into the material of each separate plate and spread therefrom into the thin flat stream of liquid flowing through the adjacent compartments, first means providing a conduit for introducing said liquid in said first outer plate, second means providing a conduit for withdrawing said liquid from said last outer plate, and means for removably holding said plates and said first means and said second means in controlled fluid-tight assembled relationship.

2. An apparatus for irradiating liquids comprising a plurality of plates made of a material transparent to radiation in a predetermined range of wave lengths and including a first outer plate and a last outer plate, each of said plates being provided with a peripheral rib which projects from one of its surfaces and defines an area within which there is provided an opening near said rib, said plates being assembled vertically side by side in parallel planes by screw means which presses fluid-tightly the peripheral rib of each plate against the flat surface of an adjacent plate to form a series of fluid-tight relatively-thin compartments intercommunicating with each other by means of said opening in each plate which is located alternately at the lower and upper part of groups of a plurality of adjacent plates and through which compartments the liquid to be irradiated is adapted to flow seriatim as a thin flat stream, and irradiating devices for producing radiations in said range of wave lengths and surrounding the assembly of plates so that said radiations will penetrate into the material of the plates and spread into the thin flat stream of liquid flowing through the compartments, first means providing a conduit for introducing said liquid in said first outer plate, second means providing a conduit for withdrawing said liquid from said last outer plate, and means for removably holding said plates and said first means and said second means in controlled fluid-tight assembled relationship.

3. An apparatus for irradiating liquids comprising a plurality of plates made of a synthetic material transparent to radiations in a predetermined range of wave lengths and including a first outer plate and a last outer plate, each of said plates being provided with a peripheral rib which projects from one of its surfaces and defines an area within which there is provided an opening near said rib, said plates being assembled side by side in parallel planes, the peripheral rib of each plate abutting fluid-tightly against the flat surface of an adjacent plate to form a series of fluid-tight relatively thin compartments intercommunicating with each other by means of said opening in each plate and through which compartments the liquid to be irradiated is adapted to flow seriatim as a thin flat stream, and at least one irradiating device for producing radiations in said range of wave lengths and to direct them sidewise towards the assembly of plates so that they will penetrate into the material of each separate plate and spread therefrom into the thin flat stream of liquid flowing through the adjacent compartments, first means providing a conduit for introducing said liquid in said first outer plate, second means providing a conduit for withdrawing said liquid from said last outer plate, and means for removably holding said plates and said first means and said second means in controlled fluid-tight assembled relationship.

4. An apparatus for irradiating liquids comprising a plurality of plates made of a material transparent to actinic rays and including a first outer plate and a last outer plate, each of said plates being provided with a peripheral rib which projects from one of its surfaces and defines an area within which there is provided an opening near the said rib, said plates being assembled side by side in parallel planes, the peripheral rib of each plate abutting fluid-tightly against the flat surface of an adjacent plate to form a series of fluid-tight relatively thin compartments intercommunicating with each other by means of said opening in each plate and through which compartments the liquid to be irradiated is adapted to flow seriatim as a thin flat stream, and at least one irradiating device producing actinic rays the wave length of which is comprised between 3500 and 4500 A., said rays being directed sidewise towards the assembly of plates so that they will penetrate into the material of each separate plate and spread therefrom into the thin flat stream of liquid flowing through the adjacent compartments, first means providing a conduit for introducing said liquid in said first outer plate, second means providing a conduit for withdrawing said liquid from said last outer plate, and means for removably holding said plates and said first means and said second means in controlled fluid-tight assembled relationship.

5. An apparatus for the artificial maturing of freshly prepared beer comprising a plurality of plates made of Plexiglas and including a first outer plate and a last outer plate, each of said plates being provided with a peripheral rib which projects from one of its surfaces and defines an area within which there is provided an opening near said rib, said plates being assembled side by side in parallel planes, the peripheral rib of each plate abutting fluid-tightly against the flat surface of an adjacent plate to form a series of fluid-tight relatively thin compartments intercommunicating with each other by means of said opening in each plate and through which compartments the beer to be matured is adapted to flow seriatim as a thin flat stream, and at least one irradiating device producing actinic rays the wave length of which is comprised between 3500 and 4500 A., said rays being directed sidewise towards the assembly of plates so that they will penetrate into the material of each separate plate and spread therefrom into the thin flat stream of beer flowing through the adjacent compartments, first means providing a conduit for introducing said liquid in said first outer plate, second means providing a conduit for withdrawing said liquid from said last outer plate, and means for removably holding said plates and said first means and said second means in controlled fluid-tight assembled relationship.

6. An apparatus for the artificial maturing of freshly-prepared beer comprising a plurality of plates made of Plexiglas including a first outer plate and a last outer plate, each of said plates being provided with a peripheral rib which projects from one of its surfaces and defines an area within which there is provided an opening near said rib, a first standard and a second standard, said plates being assembled side by side in parallel planes between said standards, the peripheral rib of each plate abutting fluid-tightly against the flat surface of an adjacent plate to form a series of relatively thin fluid-tight compartments intercommunicating with each other by means of said opening in each plate and through which compartments the beer to be matured is adapted to flow seriatim as a thin flat stream, inlet means in said first standard communicating with the compartment defined between one of said outer plates and the next adjacent plate, outlet means in said second standard communicating with the compartment defined between the other of said outer plates and the next adjacent plate, means for removably holding said plates between said standards in controlled fluid-tight assembled relationship and at least one irradiating device producing actinic rays the wave length of which is comprised between 3500 and 4500 A., said rays being directed sidewise towards the assembly of plates so that they will penetrate into the material of each separate plate and spread therefrom into the thin flat stream of beer flowing through the adjacent compartments.

References Cited in the file of this patent

UNITED STATES PATENTS

| | | |
|---|---|---|
| 1,271,790 | Snelling | July 9, 1918 |
| 1,981,583 | Craig | Nov. 20, 1934 |
| 2,248,618 | Fischer | July 8, 1941 |
| 2,636,991 | Postell | Apr. 28, 1953 |
| 2,648,774 | Whitlock | Aug. 11, 1953 |
| 2,740,049 | Stein | Mar. 27, 1956 |
| 2,830,016 | Cier et al. | Apr. 8, 1958 |
| 2,868,987 | Salsig et al. | Jan. 13, 1959 |